(12) United States Patent
Hadley et al.

(10) Patent No.: US 9,491,908 B2
(45) Date of Patent: Nov. 15, 2016

(54) TRACTOR MOUNTED COTTON HARVESTER

(75) Inventors: Bruce A. Hadley, Ephrata, PA (US);
Kevin S. Richman, Plainfield, IL (US);
Steven E. Gaedy, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 112 days.

(21) Appl. No.: 13/637,117

(22) PCT Filed: Mar. 25, 2011

(86) PCT No.: PCT/US2011/030040
§ 371 (c)(1),
(2), (4) Date: Sep. 25, 2012

(87) PCT Pub. No.: WO2011/119989
PCT Pub. Date: Sep. 29, 2011

(65) Prior Publication Data
US 2013/0008141 A1    Jan. 10, 2013

Related U.S. Application Data

(60) Provisional application No. 61/341,037, filed on Mar. 25, 2010.

(51) Int. Cl.
*A01D 34/00* (2006.01)
*A01D 46/08* (2006.01)

(52) U.S. Cl.
CPC ..................... *A01D 46/08* (2013.01)

(58) Field of Classification Search
CPC .................................... A01D 46/08
USPC ......... 56/12.8–13.2, 14.7, 28, 30, 34, 44, 48
See application file for complete search history.

(56) References Cited

U.S. PATENT DOCUMENTS

| | | | |
|---|---|---|---|
| 2,224,285 A * | 12/1940 | Berry | 56/42 |
| 2,517,063 A | 8/1950 | Wallace | |
| 2,526,535 A | 10/1950 | Brown | |
| 2,529,358 A | 11/1950 | Slater | |
| 2,538,454 A * | 1/1951 | Hart, Jr. | 56/30 |
| 2,672,719 A | 3/1954 | Wagnon | |
| 2,947,571 A * | 8/1960 | Hagen | 298/10 |
| 3,135,080 A * | 6/1964 | Christiansen | 56/15.3 |
| 3,137,983 A * | 6/1964 | Been | A01D 46/08 56/48 |
| 3,151,431 A * | 10/1964 | Daugherty | 56/28 |
| 3,314,221 A | 4/1967 | Forbes | |
| 3,729,910 A * | 5/1973 | Hardee | 56/11.9 |
| 3,901,008 A * | 8/1975 | Taylor et al. | 56/344 |
| 4,470,245 A | 9/1984 | Agadi | |
| 4,548,131 A * | 10/1985 | Williams | 100/1 |
| 5,407,390 A * | 4/1995 | Carney et al. | 460/119 |

(Continued)

*Primary Examiner* — Thomas B Will
*Assistant Examiner* — Mai Nguyen
(74) *Attorney, Agent, or Firm* — Patrick M. Sheldrake

(57) ABSTRACT

A tractor mounted cotton harvester carries at least one mechanized cotton picking unit removably supported beside at least one side of the tractor in a forward facing orientation, outwardly of the tractor wheels. A cotton receptacle is removably mounted to a hitch of the tractor and is lowerable for unloading. The cotton receptacle can include cotton compacting apparatus. At least one duct connects the at least one picking unit with the cotton receptacle, and a fan provides an air flow through the duct or ducts. The fan can be hydraulic, electric or mechanical powered.

7 Claims, 11 Drawing Sheets

(56) References Cited

U.S. PATENT DOCUMENTS

| | | | |
|---|---|---|---|
| 5,878,558 A * | 3/1999 | Fox et al. ..................... | 56/14.7 |
| 5,964,078 A | 10/1999 | Robinson | |
| 7,043,892 B1 | 5/2006 | Kessler | |
| 7,370,460 B1 | 5/2008 | Philips et al. | |
| 7,520,116 B2 * | 4/2009 | McCasky et al. ............... | 56/30 |
| 2007/0234696 A1 | 10/2007 | Pilatti | |
| 2011/0209454 A1 * | 9/2011 | Johannsen ...................... | 56/30 |

* cited by examiner

TRACTOR MOUNTED COTTON HARVESTER

This application is the US National Stage filing of International Application Serial No. PCT/US2011/030040 filed on Mar. 25, 2011 which claims priority to U.S. Provisional Application No. 61/341,037, filed Mar. 25, 2010, each of which is incorporated herein by reference in its entirety.

TECHNICAL FIELD

The present invention relates generally to a cotton harvester and, more particularly, to a tractor mounted cotton harvester, including a first removable component assembly including at least one side mounted, forward driven cotton picking unit, and a second removable component assembly including a cotton receptacle detachably mountable on a hitch of the tractor to allow orienting in a raised operational position, and a lowered unloading position.

BACKGROUND ART

U.S. Provisional Application No. 61/341,037, filed Mar. 25, 2010, is incorporated herein in its entirety by reference.

Much of the world cotton crop is produced on small farms or in impoverished areas such that the cost of self-propelled cotton harvesting machines cannot be afforded or justified. However, they may have, or have access to, a small to medium size tractor. Also, some farms, for instance, in India and China, have confined areas or small plots of cotton that make maneuvering a larger self-propelled harvester difficult. Additionally, for many such farms, there may be a lack of capability to handle and transport large cotton modules or larger bales.

It is known to provide detachable cotton picking apparatus and collection means for tractors. However, the known picking apparatus mostly mounts to the rear of the tractor, requiring rearward travel when picking, and the collection apparatus is located above the tractor, thereby raising the center of gravity and increasing danger of roll over.

Therefore, what is sought is a tractor mounted cotton harvester for a small or medium size tractor, which overcomes one or more of the shortcomings set forth above.

SUMMARY OF THE INVENTION

What is disclosed is a tractor mounted cotton harvester for a small or medium size tractor, which overcomes one or more of the shortcomings set forth above.

According to a preferred aspect of the invention, what is contemplated is a two component assembly combination. The first component assembly is a quick attached and quick released tractor support frame assembly which is side mounted preferably to the right side, behind, and outside of the right front tire of the tractor. This first assembly consists of one or two current product mechanized cotton harvesting picking units or drum assemblies of well known construction, mounted on a frame that can raise and lower the assemblies in the cotton crop via hydraulics or other suitable apparatus such as mechanical linkages, turnbuckles or the like. The drum or drums could include dual cotton picking rotors operable for picking opposite sides of a plant simultaneously, or a single rotor operable for picking from only one side, for lighter weight, and less cost and complexity. The drum or drums would be driven by at the mid-power takeoff of the tractor, or by the rear power takeoff via a forward transfer mechanism, by hydraulic power, or an auxiliary power unit. If provided on only one side, a counter weight can be provided on the opposite side, to balance the tractor from side to side. The counter weight or weights can be incorporated into the mounting apparatus for the drum or drums, and/or comprise wheel weights or the like.

The cotton crop would be gathered and blown by at an electric, hydraulic, or mechanical driven fan into the second component assembly, which will include a gathering chamber mounted on the back of the tractor. This chamber would accumulate the cotton loose, or would be fitted with a mechanical packing arrangement to compact it, either just to increase the capacity of the chamber, or to form mini-modules. The chamber would preferably be mounted horizontally and tiltable backwards by the tractor's three point hitch, to facilitate unloading. An additional cotton picking drum or drums component assembly could be mounted on the left side of the tractor so that crop would be harvested on both sides of the tractor. This would most desirably be in connection with a tractor having a higher ground clearance such as a high crop type tractor or the like having wheels/tires configured to straddle uncut crop. A cotton conveying duct or ducts would be connected between the at least one cotton picking unit and the cotton gathering chamber, including an internal passage through which picked cotton would be conveyed into the chamber by the air flow generated by the fan.

As an advantage of the invention, the tractor can be driven forwardly while harvesting. As another advantage, the mid-mounted picking drum or drums and hitch mounted receptacle provides good fore and aft balance, with a low center of gravity, and by counter balancing the picking units, good side to side balance is achieved.

DETAILED DESCRIPTION OF THE INVENTION

Figure 1:
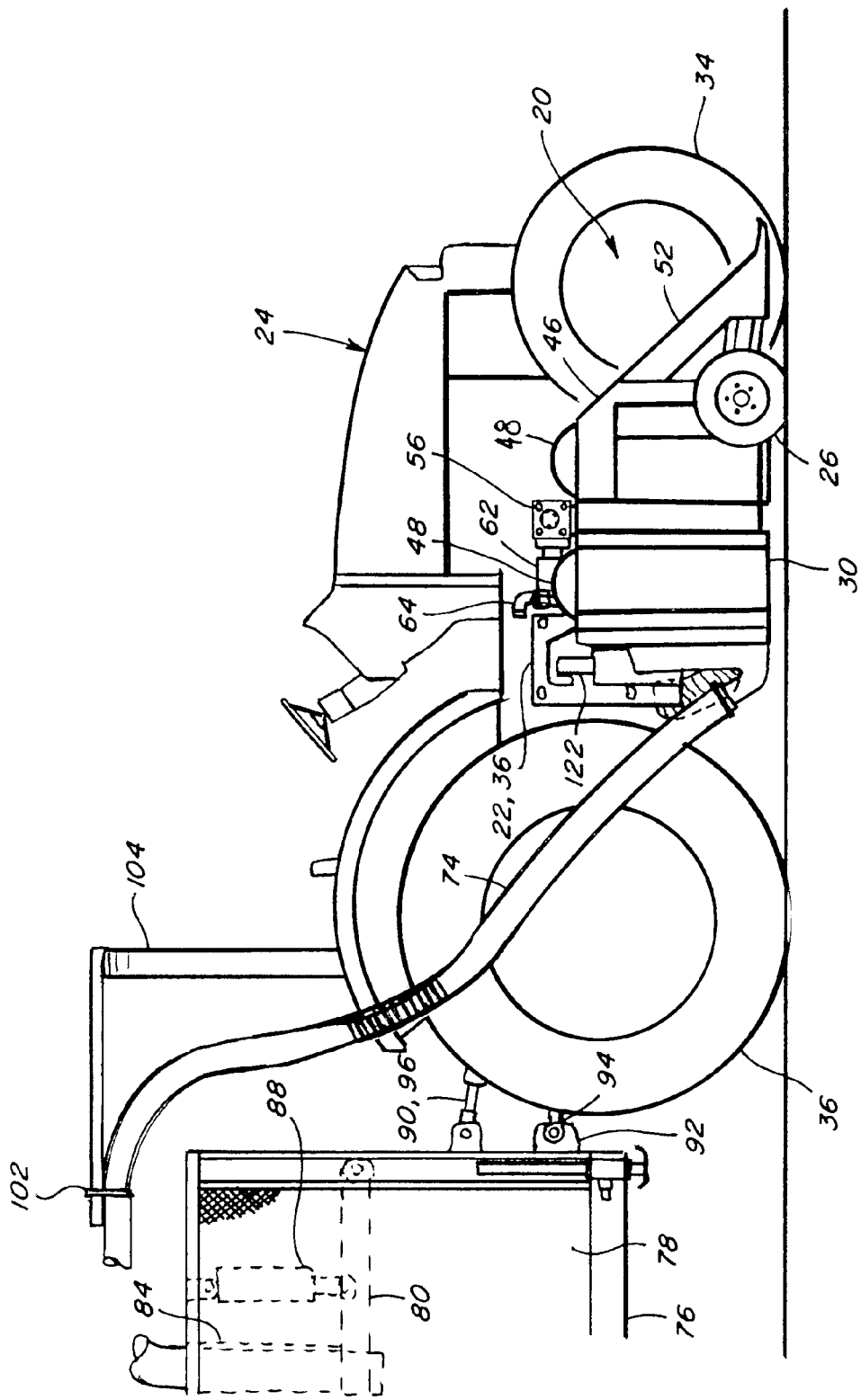
FIG. 1 is a simplified fragmentary side view of one embodiment of a tractor including a cotton harvester mounted thereon, constructed and operable according to the invention.
Figure 2:
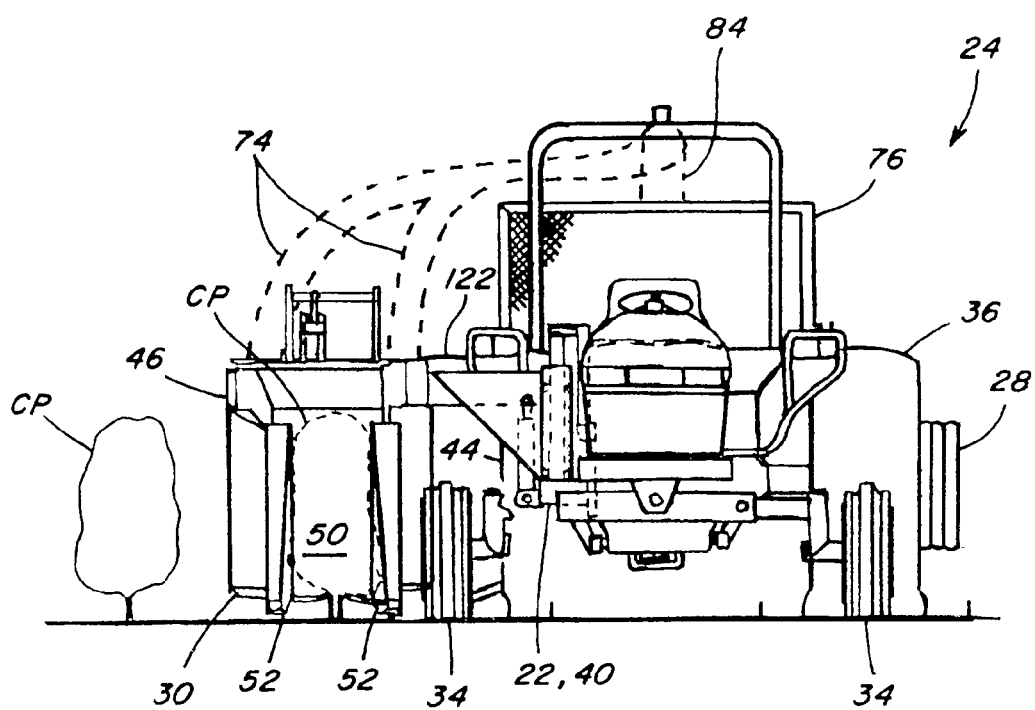
FIG. 2 is a simplified front view of the cotton harvester of FIG. 1, shown on an alternative tractor.
Figure 3:
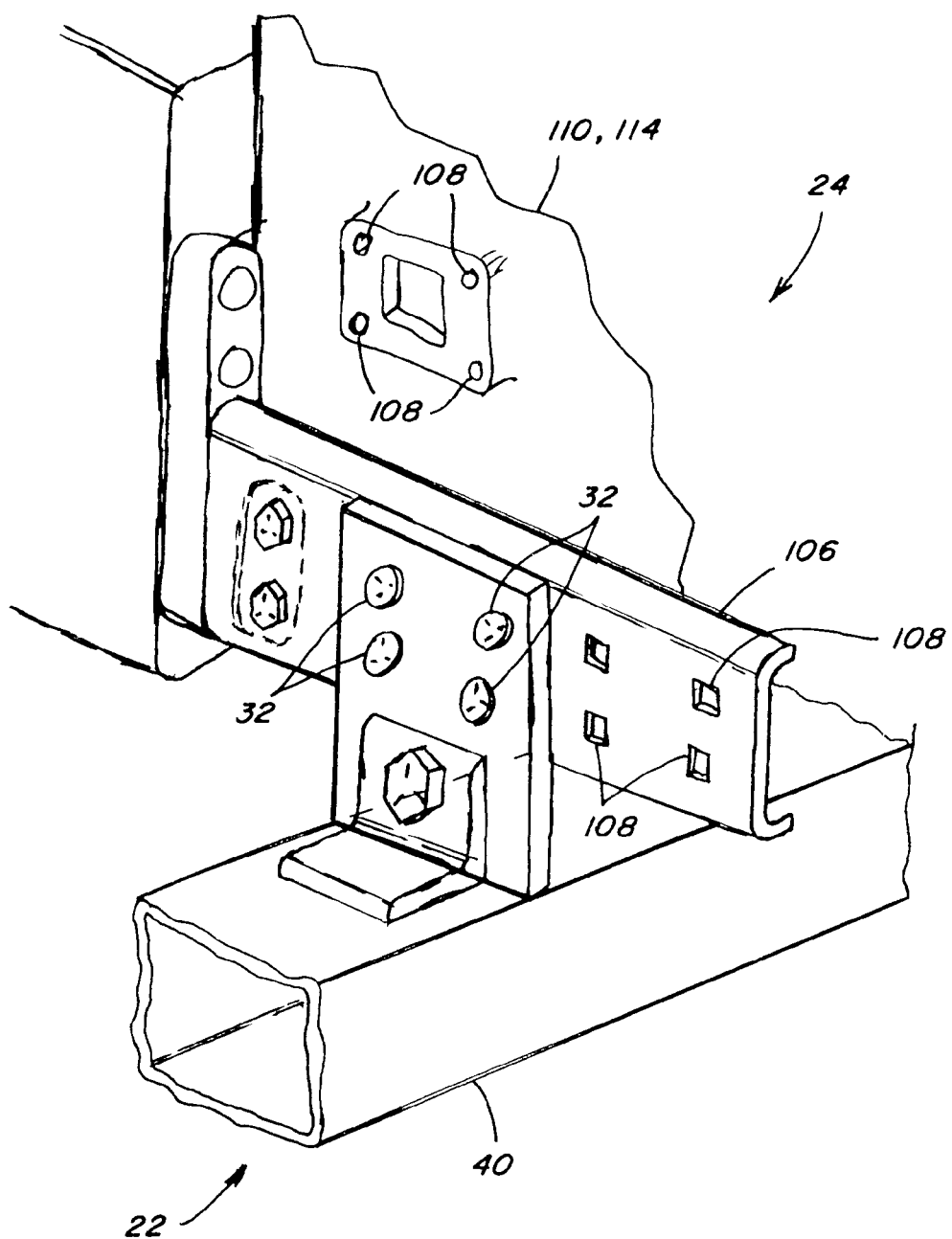
FIG. 3 is a fragmentary perspective view of aspects of a support frame of the invention showing a manner of mounting on a tractor frame rail, and also alternatively illustrating a possible mounting location on a transmission case or engine block of a tractor.

Referring now to FIGS. 1, 2, 3 and 4, therein is shown a tractor mounted cotton harvester 20 constructed and operable according to the present invention. Harvester 20 includes a support frame 22 adapted to be easily mounted to a suitable tractor, such as representative tractors 24 illustrated, which allows easy and quick removal of mechanized cotton picking units 30 and associated support apparatus of the invention. Harvester 20 can include one or more optional support wheels 26 on one or more of the cotton picking units 30 thereof, and/or a counter weight 28 on the opposite side of tractor 24, which can be, for instance, one or more common suitcase type tractor weights, wheel weights, and/or a hydraulic reservoir, or the like, for balance and stability. Cotton picking unit 30 or units are shown in FIGS. 1 and 2 mounted in a forwardly facing orientation on one side of tractor 24, for forward movement over a field containing standing cotton plants (denoted CP in several of the Figures), although it should be recognized that an additional picking unit 30 can be carried on that side of tractor 24, and one or two of the units 24 can be carried on an opposite side (FIG. 9), according to the invention.

Support frame 22 includes an element that can be removably or permanently mounted on tractor 24, for example, using an array of bolts 32 (FIG. 3), receivable in holes through a mounting bracket of a cross member 40 of frame 22, below or beside a middle region of tractor 24, in a manner similar to the well known manner of attachment of mowers, sprayers, and the like. Many tractors will have suitable frame rails or members 106 (lower view) including pre-existing holes 108 therethrough that can be used, or threaded holes 108 at suitable locations in the engine block 110 or transmission housing 114 (upper view). Most desirably, cross member 40 will attach in this manner to the tractor on both sides, and will have a mirror image or suitably configured and positioned bracket for this purpose. To accommodate attachment to a variety of tractors, the bracket of cross member 40 can be provided with a variety of mating holes and slots for receiving fasteners, or different brackets can be provided for use with different tractors. Frame 22 is mounted to tractor 24 between a front wheel 34 and a rear wheel 36, such that picking unit or units 30 carried on the frame will be adjacent to the middle side of the tractor, in the forwardly facing orientation as shown.

Figure 4:
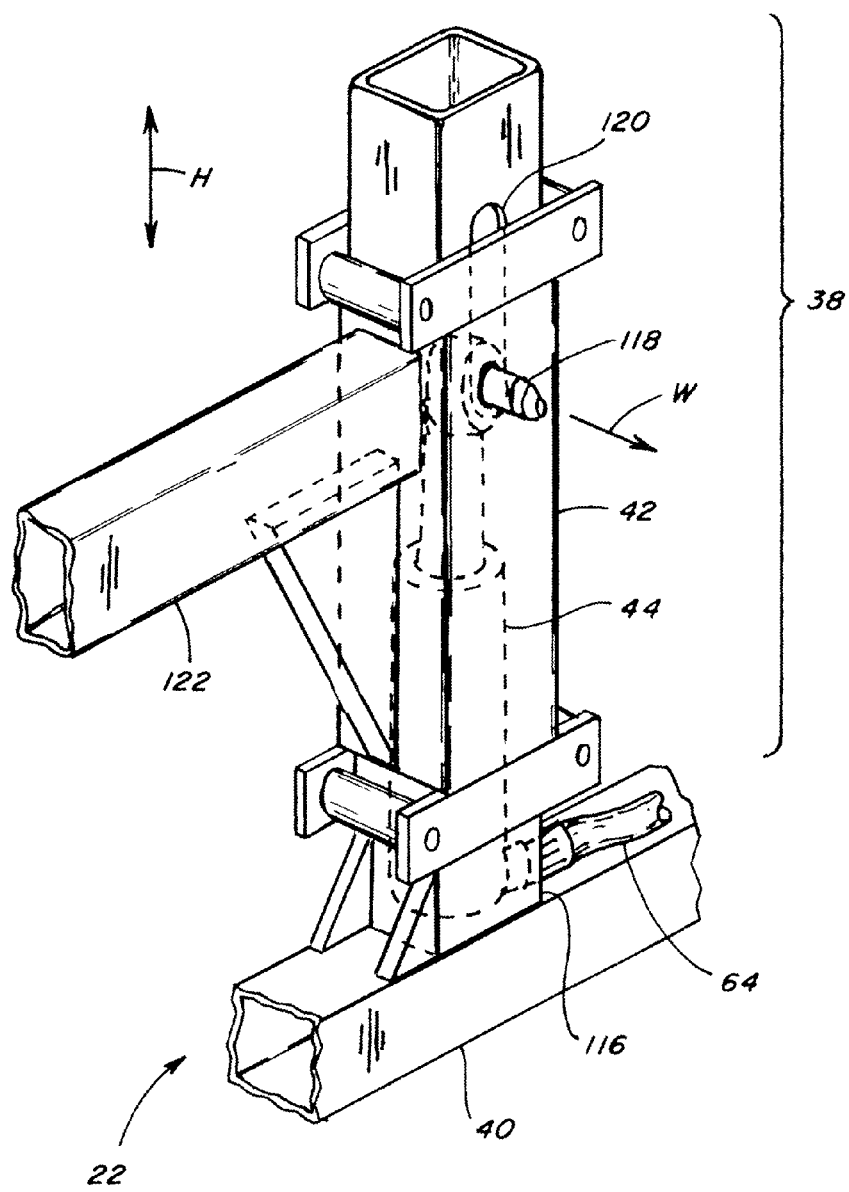
FIG. 4 is a fragmentary perspective view of elevator apparatus of the support frame.

Referring particularly to FIG. 4, frame 22 preferably carries picking unit or units 30 in a manner to allow vertical adjustment thereof relative to a ground surface therebelow. This can be accomplished using any suitable lifting or height adjusting apparatus, for example, elevator apparatus 38 shown, incorporated into frame 22 beside the tractor. Apparatus 38 includes a vertically telescoping section 42. Telescoping section 42 will preferably have an L-shape configured to slide over an upwardly extending support arm 116 of cross member 40. Section 42 can include one or more rollers for engaging arm 116 to distribute loads for smooth movement and eliminate binding. Telescoping section 42 includes a sidewardly extending horizontal toolbar 122 or other structural member, for supporting the picking unit or units 30 beside tractor 24 in cantilever relation.

Elevator apparatus includes a driver 44, here comprising a hydraulic cylinder, extendable to raise the telescoping section 42 about support arm 116 relative to cross member 40, and retractable to lower section 42, as denoted by arrow H. Driver 44 can be provided with pressurized fluid from a convenient source such as a separate system provided with the invention (see, e.g., FIG. 7) driven by a suitable power takeoff, or by a circuit of tractor 24, both via a fluid line 64. Alternatively, driver 44 can comprise, for example, a manually adjustable turnbuckle, screw jack, hydraulic jack, or the like.

In the construction shown, driver 44 is located within support arm 116 which is hollow, and connects to telescoping section 42 with a pinned connection 118 through vertical slots 120 through the guide arm. This is desirable, as removal of the pin of pinned connection 118 allows easily lifting and removing telescoping section 42 and the toolbar from cross member 40, as will be discussed. The various elements of frame 22 and elevator apparatus 38, particularly cross member 40 and telescoping section 42, can be suitably manufactured, such as by welding and/or fastening together steel tubes, box beams, channels and plates, and can have a wide variety of configurations, as desired or required for a particular application. In this regard, it should be noted that the present invention is contemplated to be adaptable for use with a wide variety of tractor types, and thus it should be noted that the lengths and heights of the various elements of frame 22 and elevator apparatus may be customized for a particular tractor or tractor type.

Toolbar 122 will have a sufficient length, strength and stiffness, so as to extend sidewardly a sufficient distance for carrying one or more of the picking units 30 at a desired position or positions beside a tractor 24, as illustrated in several of the Figures. Connection between the picking units 30 and the toolbar 122 will be in the conventional manner, such as using hooks or hangers, to allow positioning the picking units along the toolbar as desired. Again, as noted above, one or more support wheels 26 can be provided in connection with the picking unit or units, to provide additional support.

Figure 5:
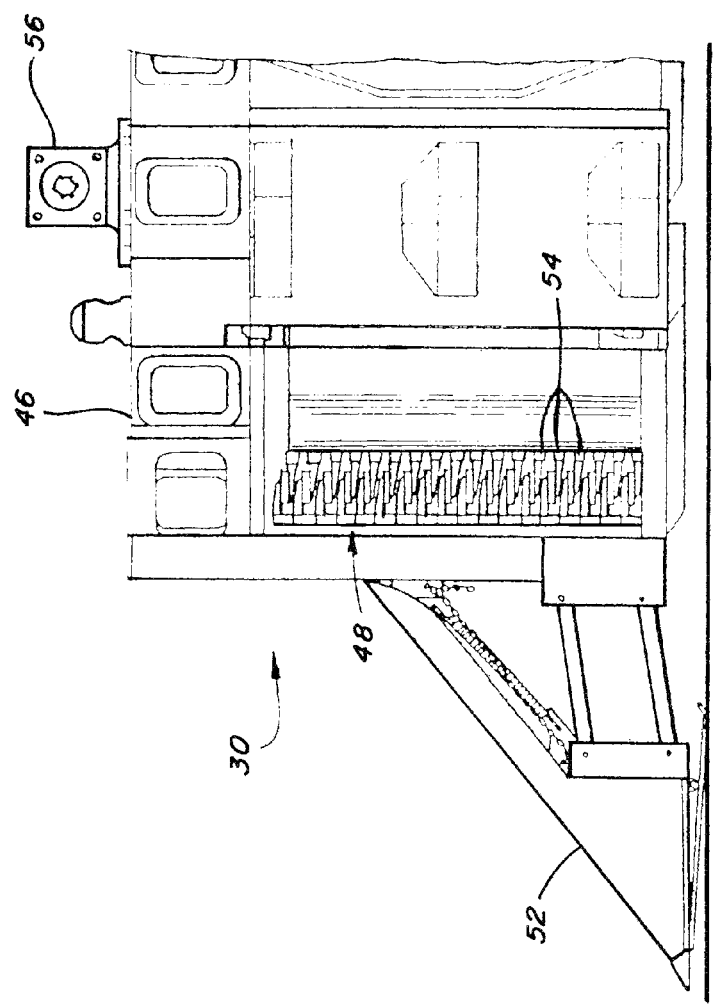
FIG. 5 is a simplified side view of a representative picking unit of the invention.
Figure 8:
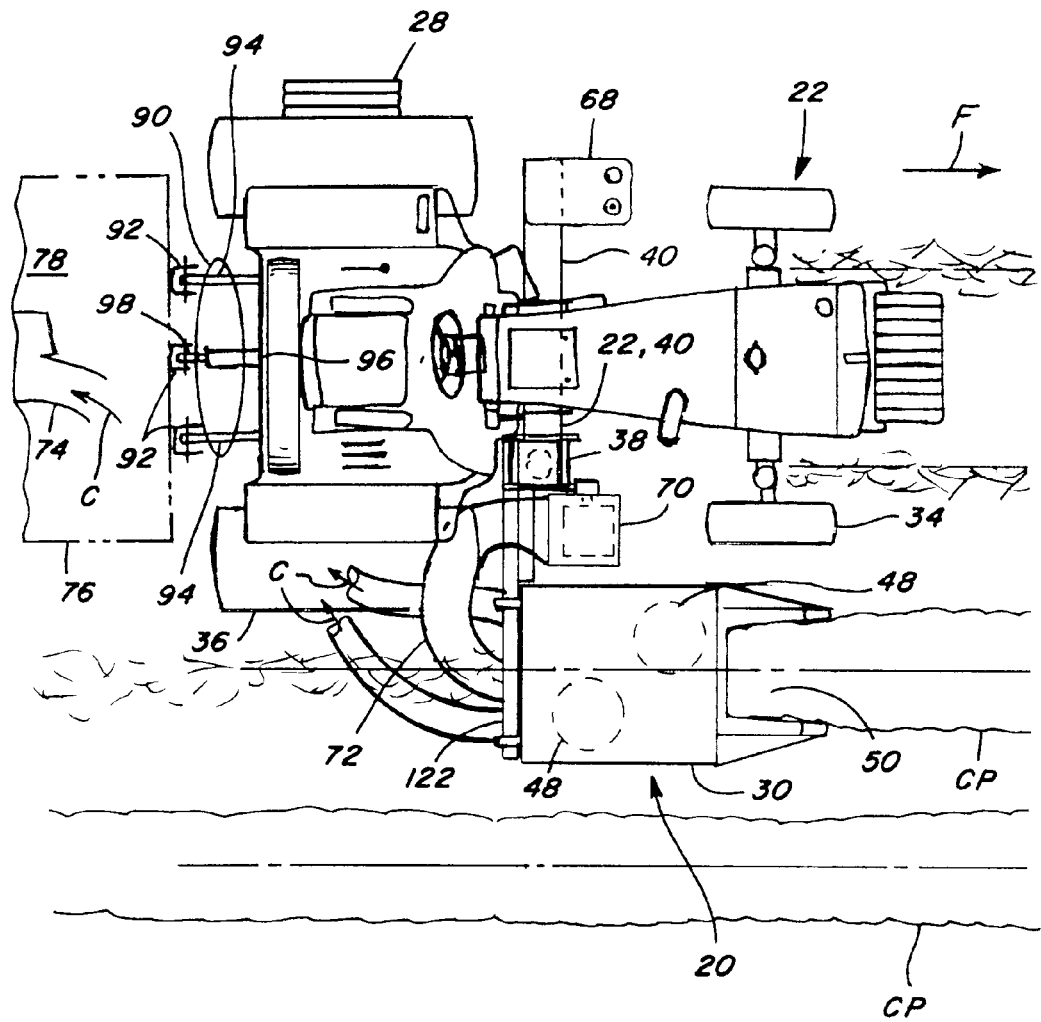
FIG. 8 is a simplified fragmentary top view of the tractor of FIG. 2 and aspects of the invention, shown picking cotton.
Figure 9:
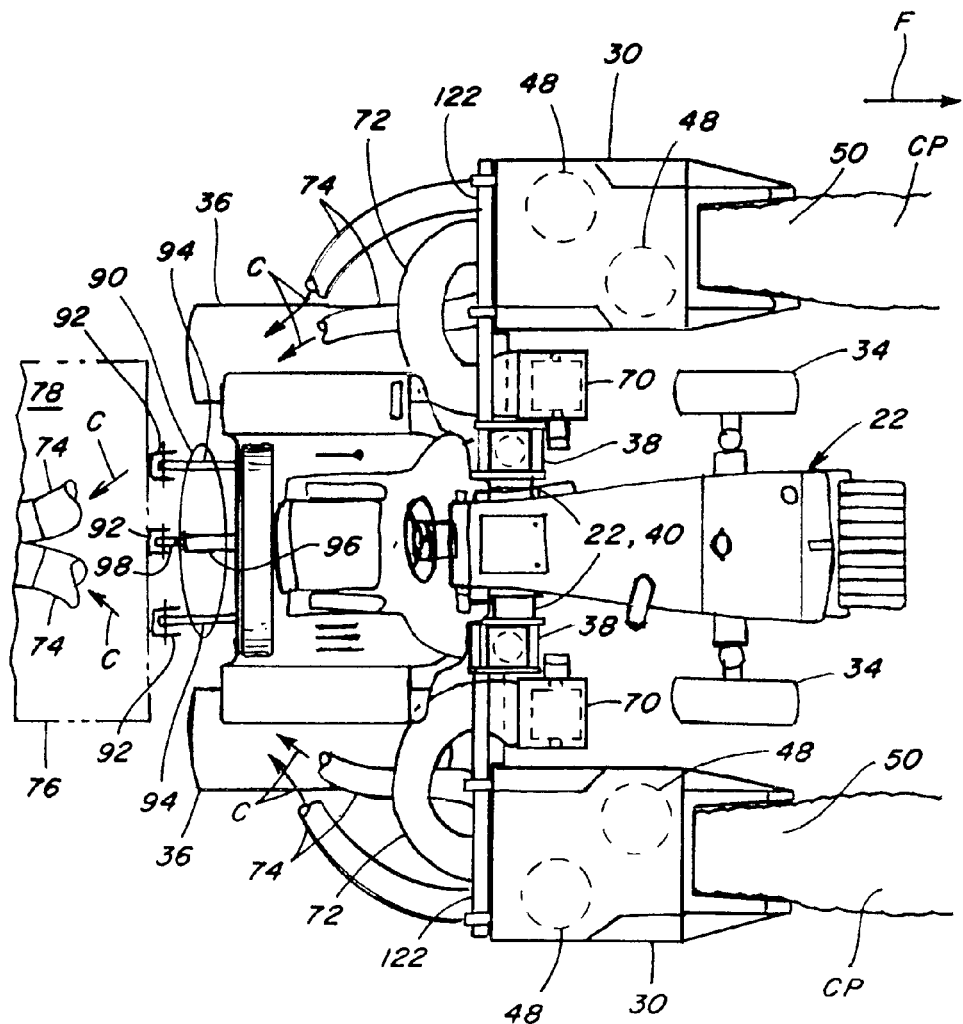
FIG. 9 is a simplified fragmentary top view of the tractor of FIG. 2, showing the invention configured with picking units on opposite sides of the tractor, shown picking two rows of cotton simultaneously.
Figure 10:
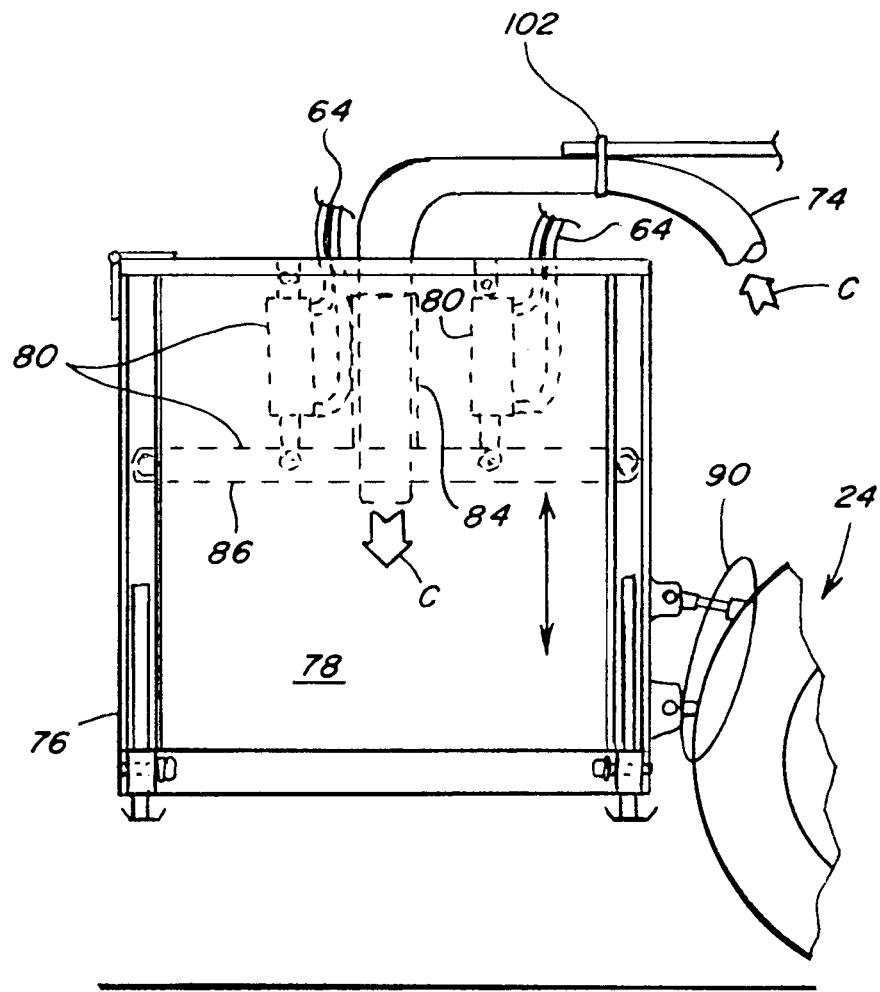
FIG. 10 is a fragmentary side view of a tractor, carrying a cotton receptacle of the invention on a three point hitch of the tractor, the receptacle shown in a raised position.

Referring also to FIG. 5, each of the picking units 30 is of well known construction, including an enclosure 46 housing a pair of upstanding picker rotor drum assemblies 48, on opposite sides of a plant channel 50 sized and shaped for receiving cotton plants in succession from rows of cotton plants CP (FIGS. 2, 8 and 9). Enclosure 46 includes vertical plant compressor sheets 52 on opposite sides of channel 50 for laterally compressing the plants in the well known manner for passage through channel 50. Each picker rotor drum assembly 48 includes a plurality of upstanding columns including sidewardly projecting picking fingers 54 that rotate about axes therethrough, for passage through plants in channel 50, for removing cotton from bolls of the cotton plants. Each picking unit additionally includes doffers (not shown) which remove the picked cotton from the picking fingers 54, also in the well known manner. Suitable picking units 30 for use with the invention are available from Case IH Agriculture, of Racine, Wis. USA and other agricultural equipment providers.

Figure 6:
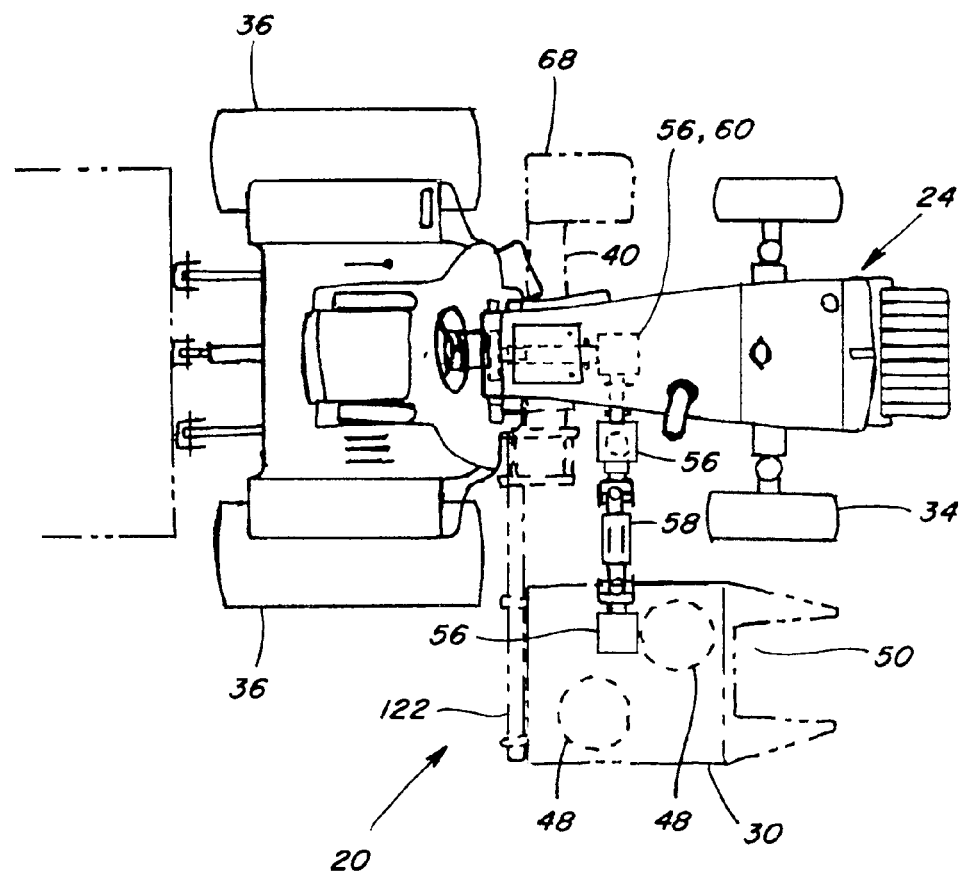
FIG. 6 is a top view of the tractor, and aspects of a drive shaft arrangement for connecting a picking unit to a mid-power takeoff of the tractor.
Figure 7:
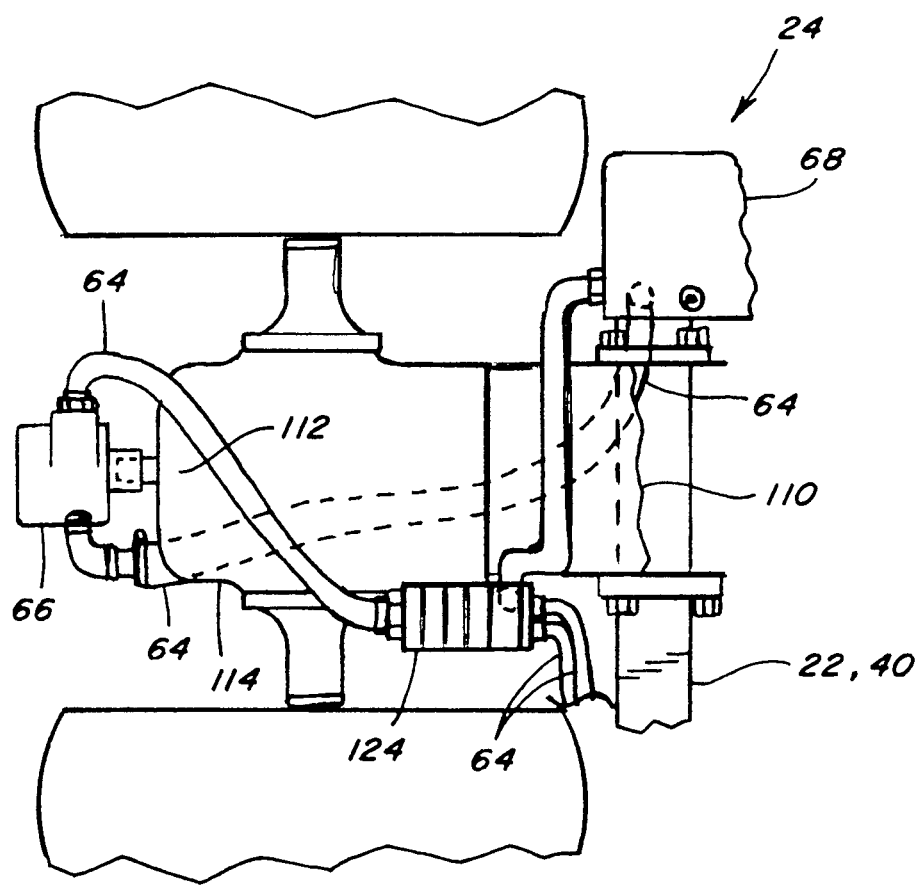
FIG. 7 is a simplified fragmentary top view of the tractor, showing aspects of a hydraulic system thereof.

Referring also to FIGS. 6 and 7, drum assemblies 48 are jointly driven by an internal gear train, which can be powered in any suitable manner. For example, in FIG. 6, gear boxes 56 driven by a drive shaft arrangement 58 in connection with a mid-power takeoff 60 of tractor 24, including additional intermediate gearboxes 56 for transferring power from the power take off 60 located below tractor 24 to the top of the picking unit or units 30, are used. Alternatively, as shown partially in FIG. 1, and in FIG. 7, picking units 30 can be powered by hydraulic motors 62 connected via fluid lines 64 with a pump 66 and reservoir 68, either of the tractor, or provided with the invention and suitably powered such as by a power takeoff of the tractor, or by an auxiliary power unit. As an example, pump 66 if separate and provided with the invention, can be powered by a mid-power takeoff 60, or a rear power takeoff 112 (shown) on the transmission housing 114 of the tractor 24 or the like. FIG. 7 also shows mounting of reservoir 68 on mounting cross member 40, on the side of the tractor opposite that carrying the picking unit. This can be advantageous, as explained below, as the reservoir can counter balance the weight of the picking unit or units 30.

Referring also to FIGS. 8, 9, 10 and 11, the cotton picked from rows of cotton plants CP by drum assemblies 48 as tractor 24 is moved in forward direction F (FIGS. 8 and 9), will be blown (arrows C) from picking unit or units 30 by air flows generated by a fan or fans 70, located on support frame 22 or elsewhere and powered by hydraulic motors provided pressurized fluid from pump 66 via fluid lines 64. Alternatively, fan or fans 70 can be hydraulically powered by a fluid circuit of the tractor, an electric motor or motors, or mechanically via a connection with a tractor power takeoff.

Fan or fans 70 is/are connected to picking unit or units 30 via ducts 72 having internal passages configured for carrying the air flows. An additional duct or ducts 74 connect picking unit or units 30 with a receptacle 76 defining and enclosing a cotton gathering chamber 78, into which the cotton C will be blown. As a non-limiting example, ducts 74 and 76 can be of plastics or other suitable material. As a non-limiting example, receptacle 76 can be of wire screen and frame or other lightweight, perforated construction. Receptacle 76 can include optional cotton compacting apparatus 80 disposed in chamber 78 and operable for compacting the received cotton in the lower region of the chamber, including optionally into a modular mini-module 82, if desired.

In one possible configuration, the air borne cotton C can be directed through a telescoping hollow duct section 84 configured to move upwardly and downwardly with a compacting plate 86 of apparatus 80. As an alternative, at least the end of duct or ducts 74 in proximity to apparatus 80 can have sufficient flexibility and volume capacity to allow attachment to the compacting plate and movement upwardly and downwardly therewith, without clogging with cotton. Apparatus 80 can include one or more drivers 88 such as hydraulic cylinders, linear actuators, or the like, connected between the structure of receptacle 76 and plate 86, operable for moving the plate downwardly against the cotton to compact it in the lower region of chamber 78, and then upwardly. The driver or drivers 88 can be located within the upper region of the receptacle, as shown, above it, or on the sides, as desired. As a result, apparatus 80 can be compacting the cotton during the harvesting operation. Driver or drivers 88 of the hydraulic type will be connected to a suitable source of pressurized fluid such as a pump 66 of the invention via fluid lines 64, and can be controlled via an operator selectable valve, in reach of the tractor driver, or automatically via a cycle control or a timer.

Figure 11:
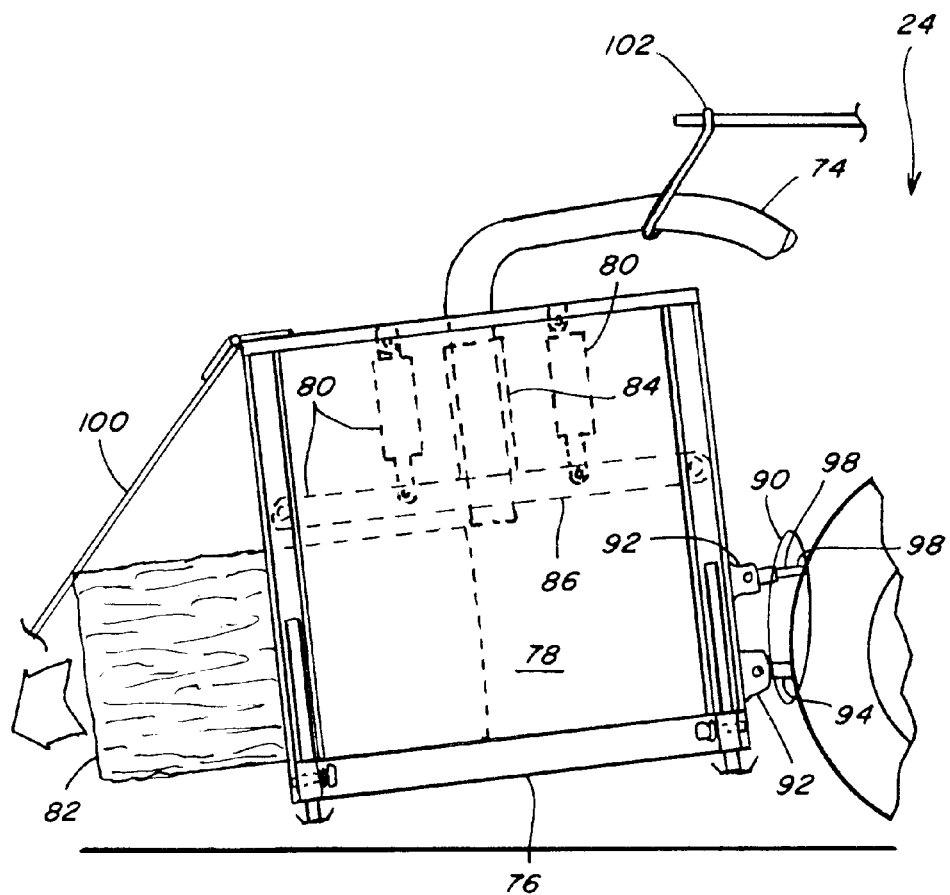
FIG. 11 is a fragmentary side view of the tractor and cotton receptacle of the invention, in a lowered position.

Receptacle 76 is advantageously mounted to and carried on tractor 24 by its standard three point hitch 90. Suitable mounting elements 92, e.g., clevises or the like, can be provided on receptacle 76 at positions alignable with attachment elements on the ends of the lower draw bars 94 for attachment with clevis pins or the like, and at a higher center location for connection to a center link 96 of the hitch, via a grab hook 98, clevis or the like. As a result, the receptacle 76 will be movable by the hydraulic cylinders of the three point hitch, between a raised or harvesting position, and a lowered unloading position. The center link of the hitch can be adjusted in length such that receptacle 76 will be tipped downwardly and rearwardly when lowered using hitch 90, as shown in FIG. 11. Duct or ducts 74 can be suitably supported to allow up and down movements of receptacle 76, such as with a clamp, bracket 102, or the like, suitably attached to structure of the tractor such as a roll cage or the like. The rear of the receptacle will include a door 100 that can be opened to allow removing the cotton, including if in a compacted mini-module 82 or loose.

Here, it should be observed that with cotton receptacle 76 and at least one picking unit 30 supported on tractor 24, it will be significantly heavier, but the picking unit or units will at least largely counter balance the receptacle fore and aft. The middle location of the picking unit or units can be advantageous in this regard as it/they will not contribute to any undesired tipping or rocking and, with additional tractor weights on the front as required, will be adequate to maintain good fore aft balance even with a full receptacle. If a picking unit or units 30 is/are carried on only one side of the tractor, the resulting side to side imbalance would likely require counterbalance, in the form of a wheel weight, tractor weights, and/or placement of the hydraulic reservoir 68 on the opposite side of the tractor (see e.g., location on cross member 40 in FIGS. 6 and 8). In this regard, it should be observed that toolbar 122 of L-shape telescoping section 42 of frame 22 may be relatively long if it is desired to locate picking unit or units 30 outwardly of the tractor wheels, and a substantial amount of counter weighting may be required to achieve suitable side to side balance.

FIGS. 2, 6, 8 and 9 show configurations of the invention. Picking unit or units 30 are positioned such that plant channel or channels 50 are aligned with a row or rows of cotton plants CP, respectively, just outwardly of adjacent front and rear wheels 34, 36 of the tractor. In the configuration of FIG. 9, tractor 24 will be suitably configured for passage over a middle row or rows of plants, e.g., as a high crop tractor, with taller wheels.

As evident from the Figures, cotton harvester 20 of the invention is readily and quickly mountable to a tractor, via the pinned connection of telescoping section 42 to cross member 40 via pinned connection 118, and pinned connection of receptacle 76 to a suitable attachment point, e.g., a three point hitch at the rear of the tractor. Hydraulic pump 66 can be mechanically attached to a power takeoff by a conventional splined connection and a bolt or two, and hydraulically connected using quick release couplings. Ducts 74 can be easily connected between the picking unit or units 30 and receptacle 76. The fluid circuit controlling drivers 44 and 88, and a fluid motor or motors driving the picking units and/or fan or fans, can include suitable quick release couplings, and valving such as a valve stack 124 shown in FIG. 7, for directing and controlling pressurized fluid as required, and which can be suitably mounted or carried.

As an example, cross member 40 of support frame 22 can be bolted to a tractor in the above described manner. Telescoping section 42 can be installed over support arm 116 of the cross member 40 and pinned with pinned connection 118. Driver 44 can be operated to lower telescoping section 42 sufficiently for passage of toolbar 122 under the hooks or brackets of picking unit or units 30, which can be supported on the ground or on blocks or timbers, and the driver 44 extended to pick up the units. Tractor 24 can be backed up to receptacle 76 and three point hitch 90 positioned for connection thereto with clevis pins or the like. The ducts 72 and 74, fluid lines 64, and/or drive shaft arrangement 58, and power takeoff fittings and valving can be connected and installed, and the harvester is ready for use. Removal of the harvester 20 would be the reverse of installation.

In light of all the foregoing, it should thus be apparent to those skilled in the art that there has been shown and described a novel tractor mounted cotton harvester. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A tractor mounted cotton harvester, comprising:
   at least one mechanized cotton picking unit configured and operable for receiving standing cotton plants and harvesting the cotton therefrom, a receptacle defining a cotton gathering chamber adapted for receiving and holding the picked cotton, at least one duct connected between the at least one cotton picking unit and the cotton gathering chamber, including an internal passage through which picked cotton can be conveyed into the chamber, and a fan configured and operable for blowing the picked cotton through the passage;
   wherein the at least one picking unit is removably mounted to a frame adjacent to at least one side of the tractor in a forward facing orientation between front and rear wheels of the tractor and includes a cotton plant receiving channel disposed sidewardly outwardly of the wheels, and the receptacle is removably attached to the rear of the tractor;
   wherein the frame of the picking unit is connected to a central frame portion of the tractor below a hood portion between the front and rear wheels and extends laterally with respect to the direction of forward travel on both side of the tractor and at least one of an additional picking unit, a counter weight and a reservoir are mounted on the opposing side of the tractor from the at least one picking unit;
   wherein the at least one picking unit is driven by a drive arrangement located between the front and rear wheels of the tractor, the drive arrangement spanning laterally between a lower point on the tractor adjacent the frame and the at least one picking unit;
   wherein the drive arrangement is one of a gear box and drive shaft arrangement powered by a mid-power take-off of the tractor or a hydraulic motor and fluid line arrangement connected via fluid lines with a pump and reservoir.

2. The cotton harvester of claim 1, wherein the at least one picking unit is vertically adjustable by an adjustment mechanism comprising a vertically oriented telescoping section connected to a portion of the frame and to a generally laterally extending toolbar supporting the at least one picking unit.

3. The cotton harvester of claim 1, further comprising a cotton compacting apparatus in the cotton gathering chamber.

4. A tractor mounted cotton harvester, comprising:
   at least one mechanized cotton picking unit configured and operable for receiving standing cotton plants and harvesting the cotton therefrom, a receptacle defining a cotton gathering chamber adapted for receiving and holding the picked cotton, at least one duct connected between the at least one cotton picking unit and the cotton gathering chamber, including an internal passage through which picked cotton can be conveyed into the chamber, and a fan configured and operable for blowing the picked cotton through the passage;
   wherein the at least one picking unit is removably mounted to a frame adjacent to at least one side of the tractor in a forward facing orientation between front and rear wheels of the tractor and includes a cotton plant receiving channel disposed sidewardly outwardly of the wheels, and the receptacle is removably attached to the rear of the tractor
   wherein the frame is connected to the tractor and extends laterally with respect to the direction of forward travel between the front and rear wheels on both side of the tractor and at least one of an additional picking unit, a counter weight and a reservoir are mounted on the opposing side of the tractor from the at least one picking unit; and
   the at least one picking unit is vertically adjustable by an adjustment mechanism comprising a telescoping section connected to a portion of the frame and to a generally laterally extending toolbar supporting the at least one picking unit;
   wherein the adjustment mechanism further comprises a driver within a hollow support arm of the frame and connects to the telescoping section with a pinned connection.

5. The cotton harvester of claim 4, further comprising a forward power takeoff of the tractor located between the front and rear wheels with respect to the direction of travel and connected in rotatably driving relation to the at least one picking unit.

6. The cotton harvester of claim 1, wherein the frame is mounted to at least one of an engine block or transmission housing of the tractor.

7. The cotton harvester of claim 1, the at least one picking unit being supported on the tractor by a pinned connection.

* * * * *